(12) United States Patent
Golder

(10) Patent No.: US 8,818,335 B2
(45) Date of Patent: Aug. 26, 2014

(54) DEVICE SECURITY

(75) Inventor: Barnaby Golder, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 601 days.

(21) Appl. No.: 12/752,377

(22) Filed: Apr. 1, 2010

(65) Prior Publication Data

US 2011/0086615 A1    Apr. 14, 2011

(30) Foreign Application Priority Data

Apr. 7, 2009    (GB) .................................. 0906057.5

(51) Int. Cl.
*H04W 4/00* (2009.01)
*H04M 3/16* (2006.01)
*H04M 1/725* (2006.01)
*G06F 21/88* (2013.01)
*H04M 1/67* (2006.01)

(52) U.S. Cl.
CPC ..... *H04M 1/7253* (2013.01); *G06F 2221/2139* (2013.01); *G06F 21/88* (2013.01); *H04M 1/67* (2013.01)
USPC ........................ 455/411; 455/552.1; 455/41.2

(58) Field of Classification Search
USPC ....................... 455/411, 552.1, 41.2
See application file for complete search history.

(56) References Cited

U.S. PATENT DOCUMENTS

| 6,154,665 | A  | * | 11/2000 | Briffett et al. ................. 455/574 |
| 2002/0032786 | A1 |   | 3/2002 | Yamada et al. |
| 2004/0203895 | A1 | * | 10/2004 | Balasuriya ................. 455/456.1 |
| 2006/0128305 | A1 | * | 6/2006 | Delalat ........................ 455/41.2 |
| 2007/0229221 | A1 | * | 10/2007 | Saotome ..................... 340/5.64 |
| 2009/0021350 | A1 |   | 1/2009 | Hatta et al. |
| 2010/0099394 | A1 | * | 4/2010 | Hainzl .......................... 455/418 |

FOREIGN PATENT DOCUMENTS

JP    2001-268650 A    9/2001

* cited by examiner

*Primary Examiner* — Ariel Balaoing
(74) *Attorney, Agent, or Firm* — Vorys, Sater, Seymour and Pease LLP; Vincent M DeLuca

(57) ABSTRACT

A functional device includes a local wireless transceiver for communicating with a remote wireless transceiver through a protocol according to which the local transceiver maintains a record of its connection state with selected devices that are within range of it. The device includes a memory for storing the identity of a selected device; and a controller configured to inhibit one or more functions of the functional device if the connection state maintained by the transceiver is indicative of the selected device being out of range. The performance of the functions of the device is independent of the local wireless transceiver.

13 Claims, 2 Drawing Sheets

DEVICE SECURITY

CROSS-REFERENCE TO RELATED APPLICATIONS AND CLAIM FOR PRIORITY

This application claims priority under 35 U.S.C. §119 from copending UK Application No. 0906057.5, filed in the United Kingdom on 7 Apr. 2009. The contents of that application are incorporated by reference herein in their entirety.

BACKGROUND OF THE INVENTION

This invention relates to the security of electronic devices.

Portable devices such as laptops and mobile phones are valuable and hence attractive to thieves. Thieves might want the devices for their intrinsic value, or because they are configured to provide access to certain functions. For example, a mobile phone might be stolen with a view to selling the hardware, or with a view to using any available credit to make phone calls using the phone. It is also becoming increasingly common to pay for goods through a mobile phone account. If a phone is stolen then the thief could try to buy goods using the account associated with the phone. Portable computers often provide access to confidential data that might be of value in addition to the intrinsic value of the computer hardware.

Various approaches have been taken to improve the security of portable devices. One approach is to require a user to enter a password before the device can be activated. This provides a certain level of security, but it is inconvenient for a user to enter a password every time they want to use a device.

Another approach is described at http://www.msnbc.msn-.com/id/15444447/. This involves wireless communication between a mobile phone and a dedicated card. The phone can be configured to lock automatically when it is moved to more than a pre-set distance (8, 20 or 40 m) away from the card. If the user of the phone keeps the card in a bag or pocket, the phone recognizes when the card moves too far away and locks automatically to prevent someone else from making a call. This system has the disadvantage that it involves dedicated hardware which would significantly increase the cost of the phone.

Lockitnow™ software available from:

http://www.blueshareware.com/lockitnow.asp can run on a computer and allow the computer to be locked automatically after a period of inactivity when a particular Bluetooth-equipped device is not in range. This approach has the advantage that it uses existing hardware, and enhances security using only additional software. However, the software runs on the computer at the application level. In order to identify which Bluetooth devices are in range it must either (a) instruct the computer's Bluetooth hardware to perform a scan for nearby devices, and to then allow time for the scan to be completed, or (b) instruct the computer's Bluetooth hardware to attempt to make a connection to a specific device and then await the result of the connection attempt. These processes take a significant length of time, and require ongoing communications between the hardware and the application levels. They are therefore not well suited to making frequent checks on the proximity of a particular Bluetooth-equipped device. Conversely, if a stolen computer is to be locked promptly then it is desirable to check frequently whether the particular Bluetooth device is still in range. Furthermore, supporting ongoing communications consumes significant battery energy.

There is therefore a need for an improved security mechanism.

SUMMARY OF THE INVENTION

It is known that devices that include a wireless transceiver can inhibit functions of the device that the transceiver currently cannot perform. For example, a cellular phone might reject an attempt by the user to place a call if the phone is aware that it is out of cellular coverage.

According to one aspect of the present invention there is provided a functional device comprising: a local wireless transceiver for communicating with a remote wireless transceiver by means of a protocol according to which the local transceiver maintains a record of its connection state with selected devices that are within range of it, the device comprising: a memory for storing the identity of a selected device; and a controller configured to inhibit one or more functions of the functional device if the connection state maintained by the transceiver is indicative of the selected device being out of range, the said function(s) being function(s) the performance of which is/are independent of the local wireless transceiver.

According to another aspect of the present invention there is provided a method for controlling a functional device comprising a local wireless transceiver for communicating with a remote wireless transceiver by means of a protocol according to which the local transceiver maintains a record of its connection state with selected devices that are within range of it, the method comprising: storing the identity of a selected device; and inhibit one or more functions of the functional device in response to a determination that the connection state maintained by the transceiver is indicative of the selected device being out of range, the function(s) being function(s) the performance of which is/are independent of the local wireless transceiver.

The function(s) may include the control of the device by means of a user interface. The function(s) may include the initiation of communications with a remote station. The function(s) may include relatively convenient enablement of a user interface device of the functional device, in which case the controller may be configured to, if the user interface device is disabled and the connection state maintained by the transceiver is indicative of the selected device being out of range, enable the user interface only in response to a relatively inconvenient operation being performed.

The local wireless transceiver may be a Bluetooth transceiver.

The functional device may be a mobile phone.

BRIEF DESCRIPTION OF THE DRAWINGS

The present invention will now be described by way of example with reference to the accompanying drawing, in which.

DETAILED DESCRIPTION OF THE INVENTION

The device to be described below locks automatically when a connection state that it inherently maintains with another devices changes to indicate that that other device is out of range.

Figure 1:
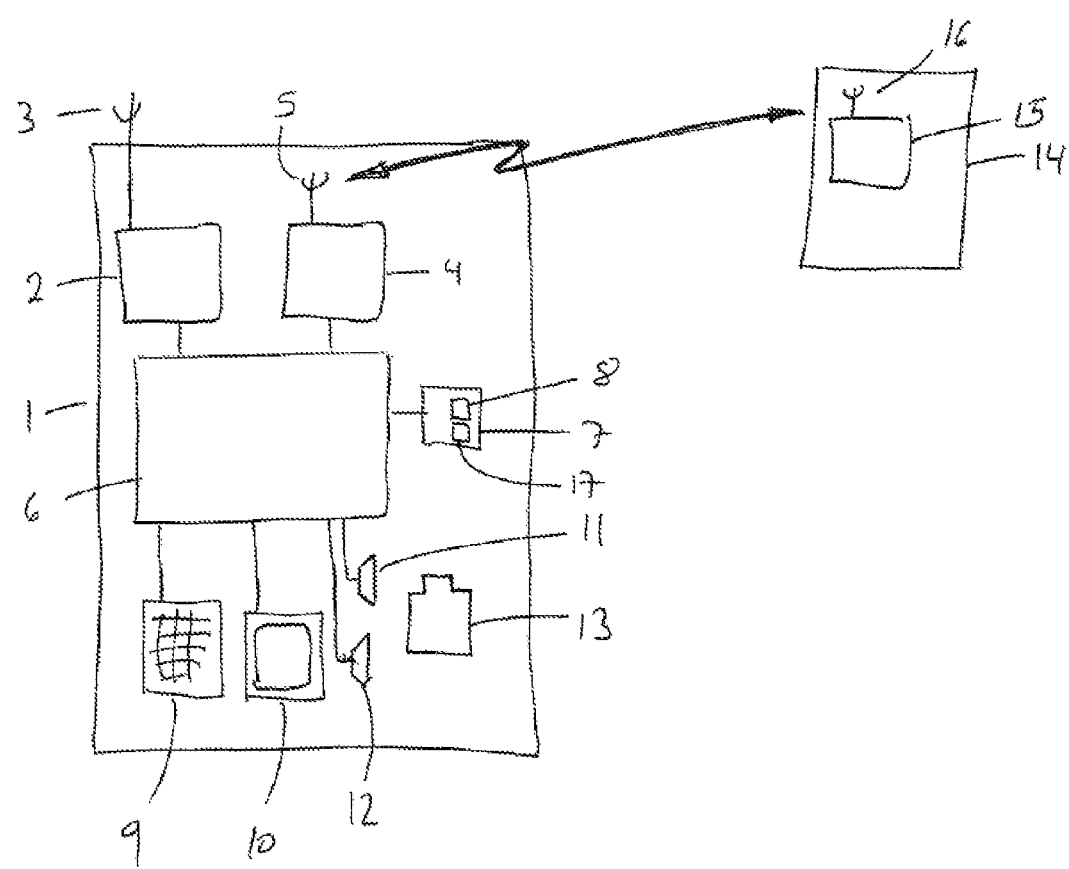
FIG. 1 is a schematic diagram of a Bluetooth-equipped mobile phone and another device.

The mobile phone 1 of FIG. 1 comprises a transceiver 2 for communication via a first antenna 3 with a mobile phone system and a Bluetooth transceiver 4 for communication via a second antenna 5 with Bluetooth devices. The transceivers 2, 4 are connected to a control unit 6 which controls the operation of the mobile phone 1. The control unit 6 includes a microprocessor that executes code stored at 8 in a non-volatile memory 7. The microprocessor is also connected to a keypad 9 and a microphone 11 for receiving input from a user, and to a display 10, and a loudspeaker 12 for outputting data to a user. The mobile phone 1 is powered by a battery 13.

The Bluetooth transceiver 4 is capable of operating in the normal manner for Bluetooth communications with other devices. That is, before the transceiver 4 can exchange traffic data with another device it must pair with the other device. That involves the devices exchanging security codes. If the code supplied to one device ("device A") by the other device ("device B") matches the code that device B was expecting to receive in the pairing operation then device B will accept pairing with device A. If both devices accept pairing with each other then they become a trusted pair. On pairing with each other, the devices store credentials that allow them to link automatically with each other the next time they come in range of each other.

Bluetooth devices can adopt a discoverable mode or a non-discoverable mode. In discoverable mode they can be identified by any other Bluetooth device in range. In non-discoverable mode they will only be identified by other Bluetooth devices that are in range and that they have already paired with.

The procedure for setting up a connection in the Bluetooth system is as follows. Bluetooth transceivers are initially in a standby state. One transceiver ("device A") makes an inquiry in order to establish which other transceivers are in range. To do this it broadcasts an inquiry message. Other transceivers that receive the inquiry message respond with a message that includes their device identity ID. The responding devices enter a page scan mode in which they listen for paging messages from device A. On receiving a response from another device to which it wants to connect device A sends paging messages that specify that other device's access code. It repeats this until the other device answers with a page respond message. Then, after additional signalling, the devices enter the connected state until one device drops the connection or the devices go out of range of each other.

In FIG. 1 device 14 is another Bluetooth-enabled device. Device 14 includes a Bluetooth transceiver 15 and an antenna 16. It will be supposed that the mobile phone 1 and the device 14 have paired, so they can connect automatically to each other.

Figure 2:
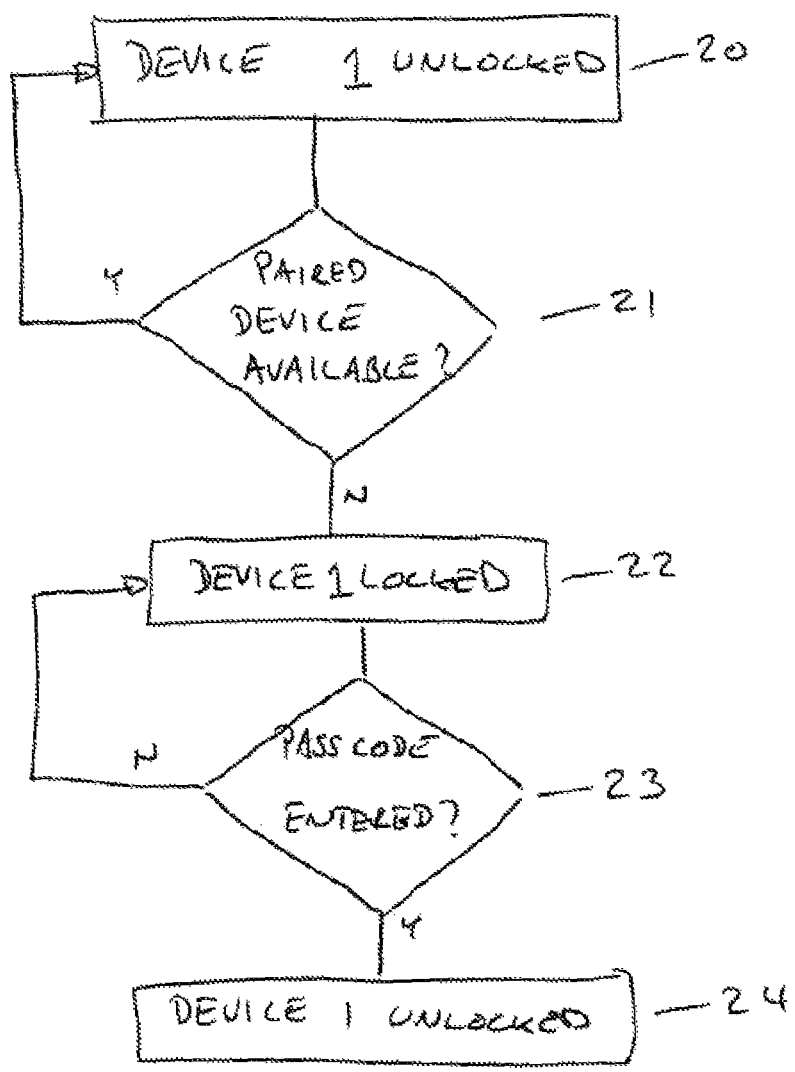
FIG. 2 illustrates how the device switches between locked and unlocked states.

The software stored at 8 that can be run by the controller 6 enables the controller to implement a security mechanism through interaction with the Bluetooth transceiver 4. That mechanism will be described below with reference to FIG. 2.

Initially the mobile phone 1 is in an unlocked state. (Step 20). It remains in that state until it is determined (step 21) that signals from the paired device 14 can no longer be detected. Although this is indicative of the device 14 being out of range, the reason for the change in state might not be because the device 14 has moved relative to the mobile phone 1. It could, for example, be because an interferer or attenuating object has become present or because device 14 has been switched off. If it is detected that device 14 can no longer be detected then the mobile phone 1 enters a locked state. In the locked state one or more functions of the mobile phone 1 are disabled. The mobile phone 1 can then be unlocked only by the user successfully performing a predetermined authentication process such as entering a passcode correctly. (Steps 23 and 24).

The controller 6 determines whether the mobile phone 1 is to be in the locked state or the unlocked state. Conveniently, the details of how it makes that determination can be configured by the user.

When the mobile phone 1 is in the unlocked state the controller 6 processes information from the Bluetooth transceiver 4 to identify if and when the paired device 14 becomes unavailable. To do that it could signal the Bluetooth transceiver 4 to transmit an inquiry message, process any replies and then report the results to the controller 6. However, it would take some time for the results to be generated since timing conflicts between responding devices mean that a significant length of time must be left in order for any potential responses to be received. More preferably, the controller 6 simply checks whether a Bluetooth connection is established to the paired device 14. That can be checked quickly because the mobile phone 1 always maintains a record of the state of its Bluetooth connections. The controller 6 could make the desired form of check every few seconds in order to maintain up-to-date information about the status of device 14. Instead of the controller 6 initiating the check, the Bluetooth transceiver 4 could be configured to report automatically to the controller 6, for example by means of an interrupt, when there is a change in its connection state.

Various means could be used to unlock the mobile phone 1 when it has been locked. It could, for example, be unlocked by the controller 6 in response to the user entering a predetermined passcode into the keypad 9, or in response to a connection to the device 14 being re-established.

When the mobile phone 1 is in its unlocked mode it is fully usable, as normal. When the mobile phone 1 is in its locked mode, one or more features of the mobile phone 1 are disabled. The level of disablement may be configurable by the user, but it could, for example, include one or more of the following:

Keypad 9 is locked other than for entry of the passcode

Keypad 9 is active but the mobile phone 1 is incapable of making phone calls

The mobile phone 1 issues an audible alert by means of the loudspeaker 12. This could function as a theft alarm, or to alert the user that he has mistakenly left the device 14 behind.

The mobile phone 1 alerts the mobile phone network to disable one or more functions of the mobile phone 1 or to initiate tracking of the device's location For safety it is preferred that the mobile phone 1 can make emergency phone calls even when it is locked.

The device 14 could be a dedicated security dongle that performs no function other than interacting with the mobile phone 1 for the security process described above. In that case the device 14 could be small and readily carried by the user in a trouser pocket or somewhere else that means it is unlikely to be stolen or lost at the same time as the mobile phone 1. Alternatively, the device 14 could be another Bluetooth device that performs additional functions and that the user might want to have with him. Examples include music players, GPS positioning devices, cameras, Bluetooth headsets and laptop computers. In the future other items such as articles of clothing and jewelry could be equipped with Bluetooth functionality and could serve as the device 14.

To configure the security functions of the mobile phone 1, the user pairs the mobile phone 1 with a selected Bluetooth-equipped device that is to function as device 14. He then informs controller 6 that the locking/unlocking of the mobile phone 1 is to be dependent on the availability of a connection to that selected device 14. He may also want to configure a passcode for the mobile phone 1 and to configure the behaviour that the mobile phone 1 will adopt in the event that it is locked.

An area 17 of the non-volatile memory 7 stores user-configured data such as trusted pair credentials and device settings.

The mobile phone 1 may also implement a key-guard function, in which the keypad 9 is temporarily disabled to avoid inadvertent presses of the keypad 9 when the mobile phone 1 is in a user's pocket or handbag. The mobile phone 1 may enter that mode automatically after a period of inactivity and/or when a specific combination of keys is pressed. The manner in which it leaves that mode may be dependent on the connection state of the device 14. If a connection to the device 14 is present then the controller 6 may permit the key-guard to be disabled in a relatively simple manner, for example by the pressing of two keys in combination, either simultaneously or in sequence. That combination might be fixed, in that it cannot be altered by a user. If a connection to the device 14 is not present then the controller 6 may permit the key-guard to be disabled only if a more complex process is undergone, for example by the entry of a passcode that has or can be (depending on the user's configuration) more than two characters and/or that can be configured by the user.

In comparison to a conventional mobile phone, the only change that is needed to implement the phone described above is to alter the software stored at 8. By making a relatively small alteration to the software running on a conventional mobile phone the level of security may be increased in the manner described above, i.e. so that the mobile phone 1 maintains a wireless connection to another authorised device 14 also carried by the user and should they become separated the mobile phone 1 becomes locked.

Instead of Bluetooth, other wireless standards could be used. Examples include but are not limited to: WiFi, RFID, Zigbee and Wibree.

The system described above could be implemented in devices other than mobile phones, for example computers, music players and domestic appliances such as televisions.

In the embodiment described above, a single monitoring device (mobile phone 1) cooperates with a single other monitored device (device 14). A monitoring device could cooperate with multiple monitored devices and could take action when any of those devices or a specified group of them is detected to be absent. A monitored device could cooperate with multiple monitoring devices and any of those monitoring device could take action when the monitored device is detected to be absent.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A functional device comprising:
   a local wireless transceiver for communicating with a remote wireless transceiver by means of a protocol according to which the local transceiver maintains a record of its connection state with selected devices that are within range of it by periodically checking whether a connection to a selected device is established, the device comprising:
   a memory for storing the identity of multiple selected devices; and
   a controller configured to inhibit one or more functions of the functional device if the connection state maintained by the transceiver is indicative of a selected device being out of range, the said function(s) being function(s) the performance of which is/are independent of the local wireless transceiver,
   wherein the function(s) include enablement of a user interface device of the functional device by a first predetermined process, the controller being configured to, if the user interface is disabled and the connection state maintained by the transceiver is indicative of the selected device being out of range, enable the user interface only in response to a second predetermined process, the second predetermined process being distinct from the first predetermined process, and
   wherein the controller is configured to inhibit one or more functions of the functional device if the connection state maintained by the transceiver is indicative of a specified group of the selected devices being out of range.

2. A functional device as claimed in claim 1, wherein the function(s) include the control of the device by means of a user interface device.

3. A functional device as claimed in claim 1, wherein the function(s) include the initiation of communications with a remote station.

4. A functional device as claimed in claim 1, wherein the local wireless transceiver is a Bluetooth transceiver.

5. A functional device as claimed in claim 1, wherein the functional device is a mobile phone.

6. A method for controlling a functional device comprising a local wireless transceiver for communicating with a remote wireless transceiver by means of a protocol according to which the local transceiver maintains a record of its connection state with selected devices that are within range of it by periodically checking whether a connection to a selected device is established, the method comprising:
   storing the identity of multiple selected devices; and
   inhibiting one or more functions of the functional device in response to a determination that the connection state maintained by the transceiver is indicative of a selected device being out of range, the function(s) being function (s) the performance of which is/are independent of the local wireless transceiver,
   wherein the function(s) include enablement of a user interface device of the functional device by a first predetermined process, and if the user interface is disabled and the connection state maintained by the transceiver is indicative of the selected device being out of range, enable the user interface only in response to a second predetermined process, the second predetermined process being separate and distinct from the first predetermined process, and
   further inhibiting one or more functions of the functional device in response to a determination that the connection state maintained by the transceiver is indicative of a specified group of the selected devices being out of range.

7. A functional device comprising:
   a local wireless transceiver for communicating with a remote wireless transceiver by means of a protocol according to which the local transceiver maintains a record of its connection state with selected devices that are within range of it by periodically checking whether a connection to a selected device is established, the device comprising:

a memory for storing the identity of multiple selected devices; and a controller configured to inhibit one or more functions of the functional device if the connection state maintained by the transceiver is indicative of a selected device being out of range, the said function(s) being function(s) the performance of which is/are independent of the local wireless transceiver, wherein the function(s) include convenient enablement of a user interface device of the functional device by a first user action, and the controller is configured to, if the user interface is disabled and the connection state maintained by the transceiver is indicative of the selected device being out of range, enablement of the user interface only in response to an operation being performed that is less convenient than enablement of the user interface by said first user action, and wherein the controller is configured to inhibit one or more functions of the functional device if the connection state maintained by the transceiver is indicative of a specified group of the selected devices being out of range.

8. A functional device as claimed in claim 1, wherein the first predetermined process comprises pressing two keys of the functional device in combination.

9. A functional device as claimed in claim 1, wherein the second predetermined process comprises entry of a passcode.

10. A functional device as claimed in claim 1, wherein the controller is configured to inhibit one or more functions of the functional device if the connection state maintained by the transceiver is indicative of any of the selected devices being out of range.

11. A method as claimed in claim 6, wherein the first predetermined process comprises pressing two keys of the functional device in combination.

12. A method as claimed in claim 6, wherein the second predetermined process comprises entry of a passcode.

13. A method as claimed in claim 6, further comprising inhibiting one or more functions of the functional device if the connection state maintained by the transceiver is indicative of any of the selected devices being out of range.

* * * * *